US010523679B2

(12) United States Patent
Glass et al.

(10) Patent No.: US 10,523,679 B2
(45) Date of Patent: Dec. 31, 2019

(54) SYSTEMS AND METHODS FOR IMPROVING PRIVACY IN VEHICULAR AD HOC NETWORK

(71) Applicant: MOTOROLA SOLUTIONS, INC., Chicago, IL (US)

(72) Inventors: Stephen C. Glass, Plantation, FL (US); David Klein, Parkland, FL (US); Imadeldin Mahgoub, Boca Raton, FL (US); Monika Rathod, Lake Worth, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 187 days.

(21) Appl. No.: 15/866,232

(22) Filed: Jan. 9, 2018

(65) Prior Publication Data
US 2019/0215325 A1 Jul. 11, 2019

(51) Int. Cl.
*H04L 29/06* (2006.01)
*H04L 9/32* (2006.01)
*H04L 9/30* (2006.01)

(52) U.S. Cl.
CPC .............. *H04L 63/102* (2013.01); *H04L 9/30* (2013.01); *H04L 9/3247* (2013.01); *H04L 63/105* (2013.01); *H04L 63/107* (2013.01)

(58) Field of Classification Search
None
See application file for complete search history.

(56) References Cited

U.S. PATENT DOCUMENTS

| 8,763,131 | B2 | 6/2014 | Archer et al. |
| 8,925,092 | B1 | 12/2014 | Johansson et al. |
| 9,553,730 | B2 | 1/2017 | Saboor et al. |
| 2011/0131224 | A1 | 6/2011 | Bodin et al. |
| 2012/0233695 | A1 | 9/2012 | Mahaffey et al. |
| 2016/0191540 | A1* | 6/2016 | Fuka .................. G06F 16/86 726/4 |

(Continued)

OTHER PUBLICATIONS

Dahnnane et al., "WeiSTARS: A Weighted truST-Aware Relay Selection Scheme for VANET," IEEE (2017) Ad-Hoc and Sensor Networking Symposium, 6 pages (Year: 2017).*

(Continued)

*Primary Examiner* — Andrew J Steinle
(74) *Attorney, Agent, or Firm* — Michael Best & Friedrich LLP

(57) ABSTRACT

Systems and methods for communicating in a vehicle-to-vehicle communication network. The systems and methods include receiving an electronic certificate containing a risk rating attribute associated with one or more software applications; generating an aggregate risk rating attribute based on the risk rating attributes associated with the one or more software applications; transmitting the aggregate risk rating attribute to a plurality of neighboring electronic computing devices; receiving a risk rating attribute associated with each of the plurality of neighboring electronic computing devices; selecting a trusted neighboring electronic computing device among the plurality of neighboring electronic computing devices based on a relative risk associated with the trusted neighboring electronic computing device; and transmitting a communication to the neighboring electronic device based on the selection.

20 Claims, 5 Drawing Sheets

(56) References Cited

U.S. PATENT DOCUMENTS

2017/0364942 A1* 12/2017 Arora ................ G06Q 30/0236

OTHER PUBLICATIONS

PCT/US2019/012742 International Search Report and Written Opinion of the International Searching Authority dated Apr. 11, 2019 (12 pages).
Dahmane et al., "WeiSTARS:A Weighted truST-Aware Relay Selection Scheme for VANET," IEEE (2017) Ad-Hoc and Sensor Networking Symposium, 6 pages.
Glass et al., "Neighbor Risk Reporting in Vehicular Networks," IEEE (2017) 8 pages.

* cited by examiner

| NEIGHBOR NODE ID | MINIMUM RISK RATING | AVERAGE RISK RATING | RISK RATING STANDARD DEVIATION |
|---|---|---|---|
| 03001 | 0.9 | 0.8 | 0.1 |
| 03002 | 0.5 | 0.5 | 0.3 |
| 03003 | 0.5 | 0.4 | 0.4 |
| 03004 | 0.6 | 0.2 | 0.2 |
| 03005 | 0.2 | 0.1 | 0.1 |
| 03006 | 0.9 | 0.7 | 0.1 |

FIG. 6

SYSTEMS AND METHODS FOR IMPROVING PRIVACY IN VEHICULAR AD HOC NETWORK

BACKGROUND

With the issuance of the notice of proposed rule-making (NPRM) for vehicle-to-vehicle (V2V) communications by the United States national highway traffic safety administration (NHTSA), widespread deployment of vehicular communications and networking is coming closer to reality. Vehicle-to-vehicle technology enables vehicles ranging from cars to trucks and buses to trains to send and receive basic safety messages (BSMs) to and from other vehicles. Vehicle-to-vehicle communications can help save lives, prevent injuries, and ease traffic congestion. Rapid acceptance of the technology allows large portions of the public to benefit from the improved safety supported by vehicle-to-vehicle communications.

However, with the introduction of vehicle-to-vehicle and vehicle-to-infrastructure (V2I) technologies, it is expected that many safety and non-safety applications will be deployed within the vehicle and will request information from a network. Many of the applications (for example, location based services (LBS)) will be deployed using servers that are deployed within a wider, fixed infrastructure. This deployment presents a single point of attack for potential adversaries. Privacy is a significant concern for vehicle-to-vehicle communication and can impact the rapid acceptance of this technology.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 6 illustrates a neighbor table providing a listing of the individual neighbor risk reports associated neighboring vehicles shown in FIG. 1, in accordance with some embodiments.

Figure 1:
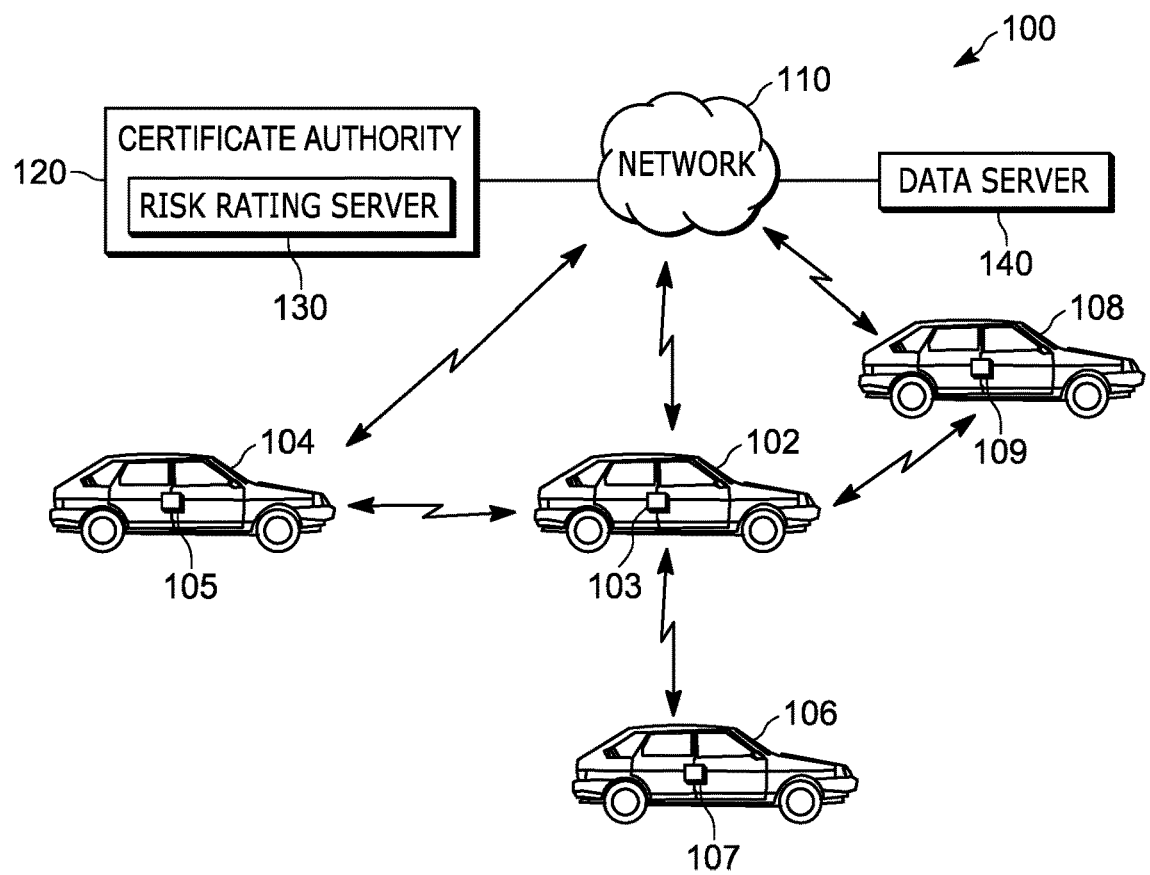
FIG. 1 illustrates a system for improving privacy in an ad-hoc vehicle-to-vehicle communication network, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Discussed herein is a novel cooperative caching scheme for use within a vehicular ad hoc network (VANET) to improve privacy. Cooperative caching can be used to improve privacy by distributing and caching data items throughout a mobile network (for example a vehicle-to-vehicle communication network) as they are requested. Embodiments provided herein allow vehicles to periodically broadcast their relative neighbor risk rating attribute to their neighboring vehicles. Vehicles in need of data (for example, non-safety based applications such as location based service applications) can first evaluate the neighbor risk rating attribute of their neighbors and then selectively choose which neighbors to query. By choosing neighbors with lower neighbor risk rating attribute, a requesting vehicle can avoid neighbors that have a higher probability of exposing data associated with the request thereby improving privacy. As a result, when a device requires an item, it will first query neighboring devices for the data item before querying a centralized server. A privacy improvement can be achieved by limiting exposure by alleviating the need to send all requests to a centralized location, which may be vulnerable to an attack, by directing queries only to the most trustworthy neighbors.

Although some mechanisms for improving privacy may be present in the 1609.x wireless access for vehicular environments (WAVE) standards, they focus on the lower layers of the protocol stack. It is expected that once the fundamental vehicle-to-vehicle and vehicle-to-infrastructure communications are in place many non-safety and safety applications will be developed and deployed in electronic computing devices within vehicles. Many of these applications may use the provided networking support to gather and share data (for example, an application that shares local traffic information and requests traffic information about the route to travel). Many of these applications may make requests that either share personal information directly or personal information may be inferred from the requests. For example, if the route of travel included in the request for traffic information terminates at a residential address, someone could infer that the owner of the vehicle lives there.

With a cooperative cache, nodes in the network cache data as it is retrieved from the source. This enables the formation of a distributed cache. When another node needs the same data, it first checks the distributed cache for the data (directly or indirectly). If the data is found in the distributed cache, it is returned to the requester. With this approach, the requests for data are spread throughout the network rather than all the requests going to a central location. This improves privacy by removing the central attack point for an adversary.

One embodiment provides an electronic computing device operating in a communication network. The electronic computing device includes a transceiver and an electronic processor coupled to the transceiver. The electronic computing device is configured to receive, via the transceiver, an electronic certificate containing a risk rating attribute associated with one or more software applications. The electronic computing device is also configured to generate an aggregate risk rating attribute based on the risk rating attributes associated with the one or more software applications; transmit, via the transceiver, the aggregate risk rating attribute to a plurality of neighboring electronic computing devices; receive a risk rating attribute associated with each of the plurality of neighboring electronic computing devices; select one or more trusted neighboring electronic computing devices among the plurality of neighboring electronic computing devices based on a relative risk associated with the trusted neighboring electronic computing devices; and transmit a communication to the neighboring electronic devices based on the selection.

Another embodiment provides a method for communicating in a vehicle-to-vehicle communication network. The method comprising receiving an electronic certificate containing a risk rating attribute associated with one or more software applications; generating an aggregate risk rating attribute based on the risk rating attributes associated with the one or more software applications; transmitting the aggregate risk rating attribute to a plurality of neighboring electronic computing devices; receiving a risk rating attribute associated with each of the plurality of neighboring electronic computing devices; selecting a trusted neighboring electronic computing device among the plurality of neighboring electronic computing devices based on a relative risk associated with the trusted neighboring electronic computing device; and transmitting a communication to the neighboring electronic device based on the selection.

Each of the above-mentioned embodiments will be discussed in more detail below, starting with example communication system and device architectures of the system in which the embodiments may be practiced, followed by an illustration of processing steps for achieving the method, and system for improving privacy in an ad-hoc network. Further advantages and features consistent with this disclosure will be set forth in the following detailed description, with reference to the figures.

Referring now to the drawings, and in particular FIG. 1, illustrates a system 100 for improving privacy in an ad-hoc vehicle-to-vehicle communication network. The system 100 includes vehicles 102, 104, 106, and 108 including electronic computing devices 103, 105, 107, and 109, disposed within the vehicles, respectively. The electronic computing devices 103, 105, 107, and 109 are configured to communicate to a certificate authority 120 and a data server 140 via a network 110. The data server 140 is a repository for various software applications that may be downloaded into electronic computing devices 103, 105, 107, and 109. The network 110 may include one or more of a mesh network, a personal area network, a vehicle-to-vehicle communication network, a local area network, and the Internet. The certificate authority 120 includes a risk rating server 130. The vehicles 102, 104, 106, and 108 may be a human-operable vehicle, or may be a self-driving vehicle operable under the control of electronic computing devices 103, 105, 107, and 109, respectively. In some embodiments, electronic computing devices 103, 105, 107, and 109 communicate with each other via a vehicular to vehicular network.

Figure 2:
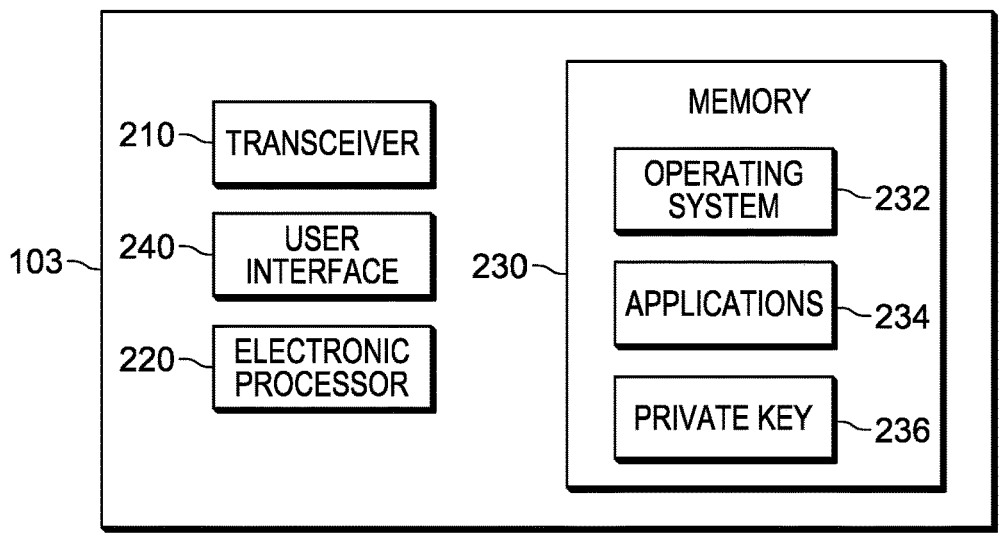
FIG. 2 is a block diagram of an electronic computing device shown in FIG. 1, in accordance with some embodiments.

FIG. 2 is a block diagram of an electronic computing device 103 shown in FIG. 1, in accordance with some embodiments. The electronic computing device 103 includes a transceiver 210, an electronic processor 220, and a memory 230. The transceiver 210 is configured to communicate with the network 110. The transceiver 210 is also configured to communicate with a plurality of neighboring electronic computing devices via a beacon transmission that is further described herein. The electronic processor 220 may include at least one processor or microprocessor that interprets and executes a set of instructions stored in the memory 230. The applications 234 may be configured to implement the methods described herein. The memory 230 may include volatile memory elements (for example, random access memory (RAM)), nonvolatile memory elements (for example, ROM), and combinations thereof. The memory 230 may have a distributed architecture, where various components are situated remotely from one another, but may be accessed by the electronic processor 202. The memory 230 includes an operating system 232, applications 234, and a private key 236. The electronic computing device 103 further includes a user interface 250. The user interface 240 that is configured to receive user input, such as to request one or more applications 234, request and provide data for the applications 234, interact with applications 234, etc. While FIG. 2 only illustrates an electronic computing device 103 associated with the vehicle 102, each vehicle (including the vehicles 104, 106, 108) in the system 100 also includes the electronic computing devices 105, 107, and 109 similar to the illustrated electronic computing device 103.

Figure 3:
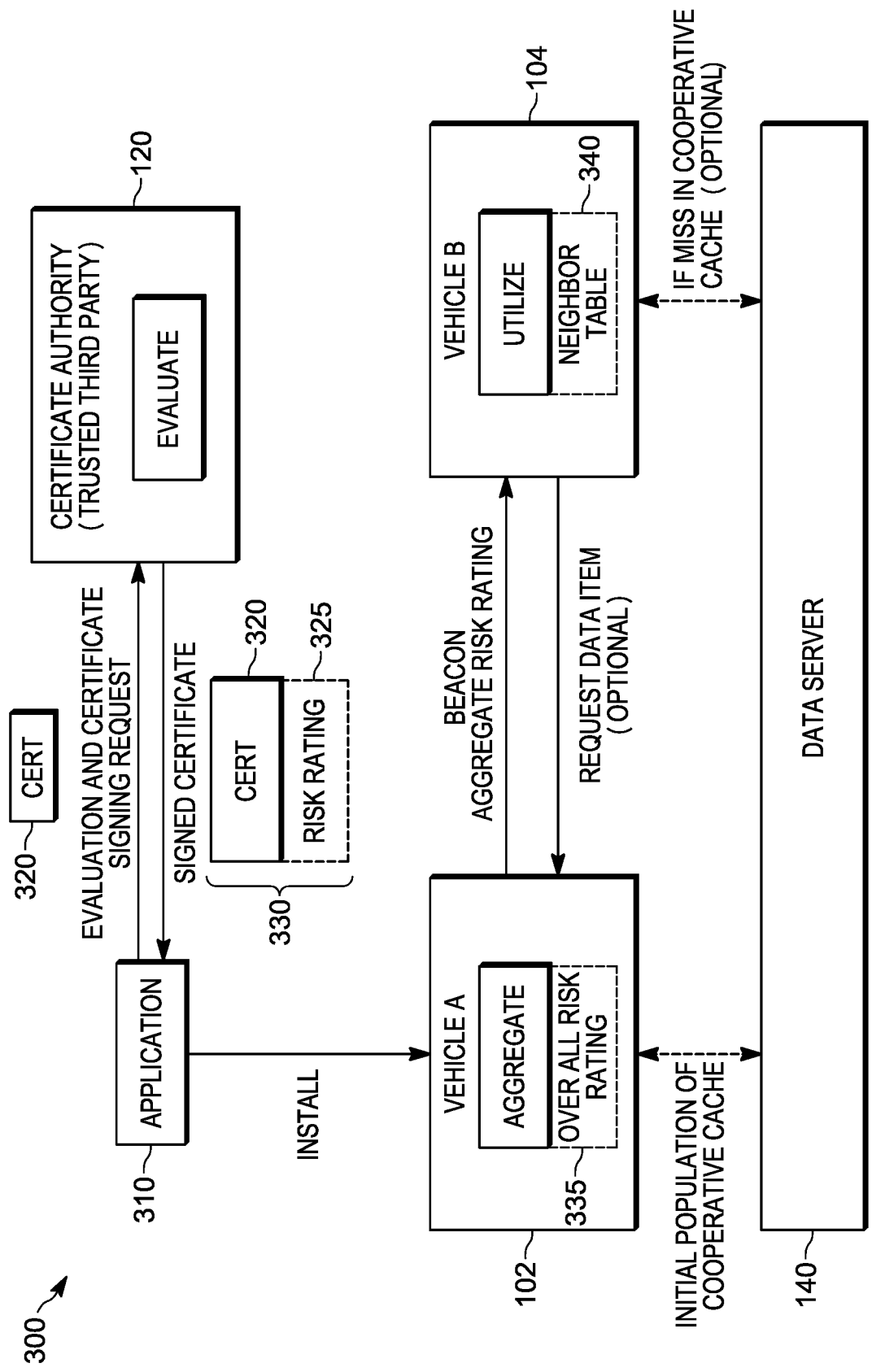
FIG. 3 illustrates an inter-process communication flow diagram of a neighbor risk rating (NRR) based system model, accordance with some embodiments.

FIG. 3 illustrates an inter-process communication flow diagram of a neighbor risk rating (NRR) based system model applied to the system 100, accordance with some embodiments. As shown in FIG. 3, the diagram 300 is described with respect to the system 100, and, in particular, the vehicle 102 and the vehicle 104, the certificate authority 120, and data server 140. The system 100 and diagram 300 also include a software application 310 to be installed in the vehicle 102, and an electronic certificate 320 associated with a risk rating attribute 325 and a signed electronic certificate 330. As shown in FIG. 3, the vehicle 102 includes an overall risk rating attribute 335 and the vehicle 104 includes a neighbor table 340. Additionally, vehicle 102 includes a neighbor table (not shown) and vehicle 104 includes an overall risk rating attribute associated with the vehicle 104. In some embodiments, the overall risk rating attribute 335 is the average risk rating attribute associated with each of the applications associated with vehicle 102. In some embodiments, the neighbor table 340 is built by adding a listing of the individual neighbor risk reports associated each of the neighboring vehicles to vehicle 104. An example of a neighbor table is shown in FIG. 6 described below in more detail. As shown in FIG. 3, the data server 140 may be used a repository of the various applications that are downloaded to or accessed by electronic computing devices in vehicles 102, and 104.

In operation, each application (for example, the software application 310) to be deployed in a vehicle (for example, the vehicle 102) is first evaluated by a trusted third party (for example, the certificate authority 120). In some embodiments, initial root certificates are installed on the vehicles providing a root of trust. A developer of an application will then submit a request to the certificate authority 120 to evaluate the software application 310 and sign the electronic certificate 320. The certificate authority 120 then follows an established process to evaluate the relative risk to be assigned to the software application 310. In some embodiments the established process of evaluating the relative risk assigned to the software application 310 includes taking into account attributes such as the author of the software application 310, the quality of the software application 310, the resources utilized by the software application 310, and so on when assigning a relative risk rating attribute. For example, if an application evaluation request is received by a wellknown company which has a good track record of quality applications and the application does not use resources such as networking access, the evaluation process may result in a very low relative risk rating attribute. However, if the application is being authored by an unknown individual who is unable to demonstrate quality (for example, using test reports, etc.) and the application accesses resources such as the Internet, the evaluation process may result in a very high relative risk rating attribute. The relative risk rating attribute may be a relative score or grading on a scale (e.g., 0-10) with a "0" being at the low relative risk end of the scale and the other end of the scale (e.g., "10") being the high relative risk end of the scale.

One security primitive used to authenticate the software application 310 is a digital signature that uses asymmetric encryption. With asymmetric encryption, the sender (for example, certificate authority 120) encrypts the software application 310 using a private key. The certificate authority 120 will also publish a public key for others to use to decrypt data that the sender encrypted. In support of authentication, the certificate authority 120 will first compute the hash of the software application 310 to be signed and then encrypt the hash with the private key. The result of this operation generates the digital signature, which the certificate authority 120 sends along with the application. When the electronic computing device 103 in vehicle 102 receives the software application 310, it will decrypt the digital signature using the public key published by the certificate authority 120 and also compute the hash of the software application 310 it received. The electronic computing device 103 will then compare the computed hash with the hash recovered from the digital signature. If the hashes match, then the vehicle 102 can be assured that the data came from the certificate authority and that it was not modified during delivery. Once the evaluation process is complete, the certificate authority 120 will add the relative risk rating attribute 325 of the software application 310 to the electronic certificate 320, sign the certificate with the certificate authority's private key, and then return the certificate to the submitter. With this assignment, the certificate authority 120 is attesting to the level of risk associated with the software application 310 based on its evaluation process.

As shown in FIG. 3, vehicle 102 communicates with vehicle 104 using a beacon that may be used to provide aggregate risk rating and requests for data items from one vehicle to the other. In some embodiments, the beacon includes a based safety message (BSM) that is transmitted and received between vehicles 102 and 104. The basic safety message is a message that is transmitted and received between vehicles over a dedicated short range communications (DSRC) wireless communications link according to society of automotive engineers (SAE) J2735 standard.

Figure 4:
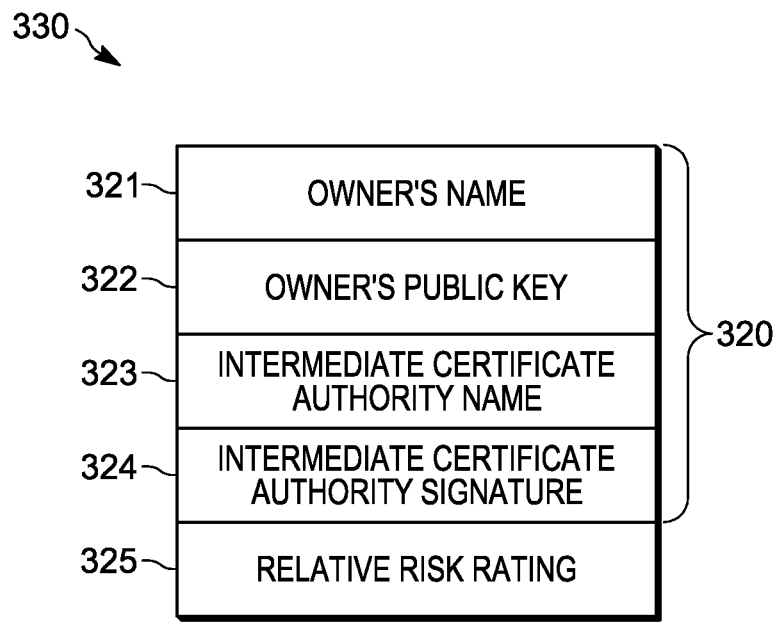
FIG. 4 illustrates a signed electronic certificate shown in FIG. 3, in accordance with some embodiments.

FIG. 4 illustrates a signed electronic certificate 330 shown in FIG. 3, in accordance with some embodiments. The signed electronic certificate 330 includes the electronic certificate 320 and a risk rating attribute 325. The electronic certificate 320 includes an application owner's name 321, an application owner's public key 322, an intermediate certificate authority name 323, and an intermediate certificate authority signature 324.

Figure 5:
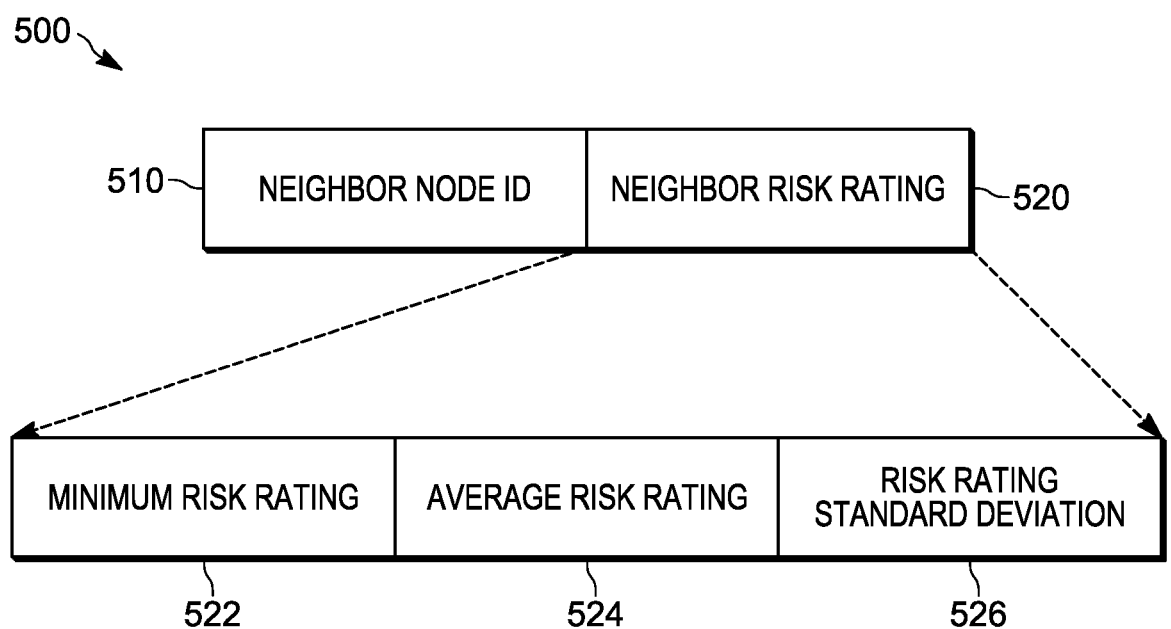
FIG. 5 illustrates a individual neighbor risk report contained within a basic safety message, in accordance with some embodiments.

FIG. 5 illustrates an individual neighbor risk report 500 contained within a basic safety message (BSM), in accordance with some embodiments. The individual neighbor risk report 500 includes a first field including a neighbor node identifier 510 and a second field including a neighbor risk rating attribute 520 associated with the neighbor node identifier 510. In some embodiments, the neighbor node identifier 510 is the media access control (MAC) address that the vehicle is currently using. The neighbor risk rating attribute 520 conveys the overall neighbor risk rating attribute associated with the vehicle sending the individual neighbor risk report 500.

The neighbor risk rating field 520 further includes a minimum risk rating attribute 522, an average risk rating attribute 524, and a risk rating standard deviation attribute 526. The minimum risk rating attribute 522 is the rating of the least trustworthy application in the vehicle. The average risk rating attribute 524 is a mean risk rating attribute of all applications deployed in a particular vehicle. The risk rating attribute standard deviation 526 is the standard deviation of the risk rating attributes of all applications deployed in a particular vehicle.

FIG. 6 illustrates a neighbor table 600 providing a listing of the individual neighbor risk reports associated with neighboring vehicles shown in FIG. 1, in accordance with some embodiments. The neighbor table 600 is an example of the neighbor table 340 of the vehicle 104 in FIG. 3. While FIG. 3 only illustrates a neighbor table 340 in the vehicle 104, each vehicle (including the vehicles 104, 106, 108) in the system 100 maintains a neighbor table similar to the neighbor table 600, which provides a neighbor risk report of all neighboring electronic computing devices (also referred to as neighbors) of the vehicle. In some embodiments, a first vehicle (e.g., the vehicle 102) is considered a neighbor of a second vehicle (e.g., the vehicle 104) when the first vehicle is in communication range of the second vehicle, as determined by the second vehicle receiving a basic safety message from the first vehicle.

The neighbor table 600 lists various risk rating associated with the neighbors of the vehicle that maintains the neighbor table 600. In some embodiments, the neighbor table 600 includes a column 602 listing neighbor node identifiers, a column 604 listing minimum risk rating associated each neighbor node identifier in column 602, a column 606 listing an average risk rating associated with each neighbor node identifier in column 602, and a column 608 listing a risk rating standard deviation associated with each neighbor node identifier in column 602. As each vehicle receives beacon transmissions from neighboring vehicles, they will update their respective neighbor tables. In some embodiments, the entries in the neighbor table 600 may be removed as neighbors move out of range of the vehicle. For example, if a basic safety message has not been received from a neighbor for a specified amount of time, the electronic computing device maintaining the neighbor table 600 determines that the neighbor is no longer in range of a particular vehicle and removes the entry from the neighbor table 600. In contrast, when the vehicle receives a basic safety message from a new vehicle not in the neighbor table 600, the vehicle adds the new vehicle to the neighbor table 600 and considers the new vehicle a neighbor.

Figure 7:
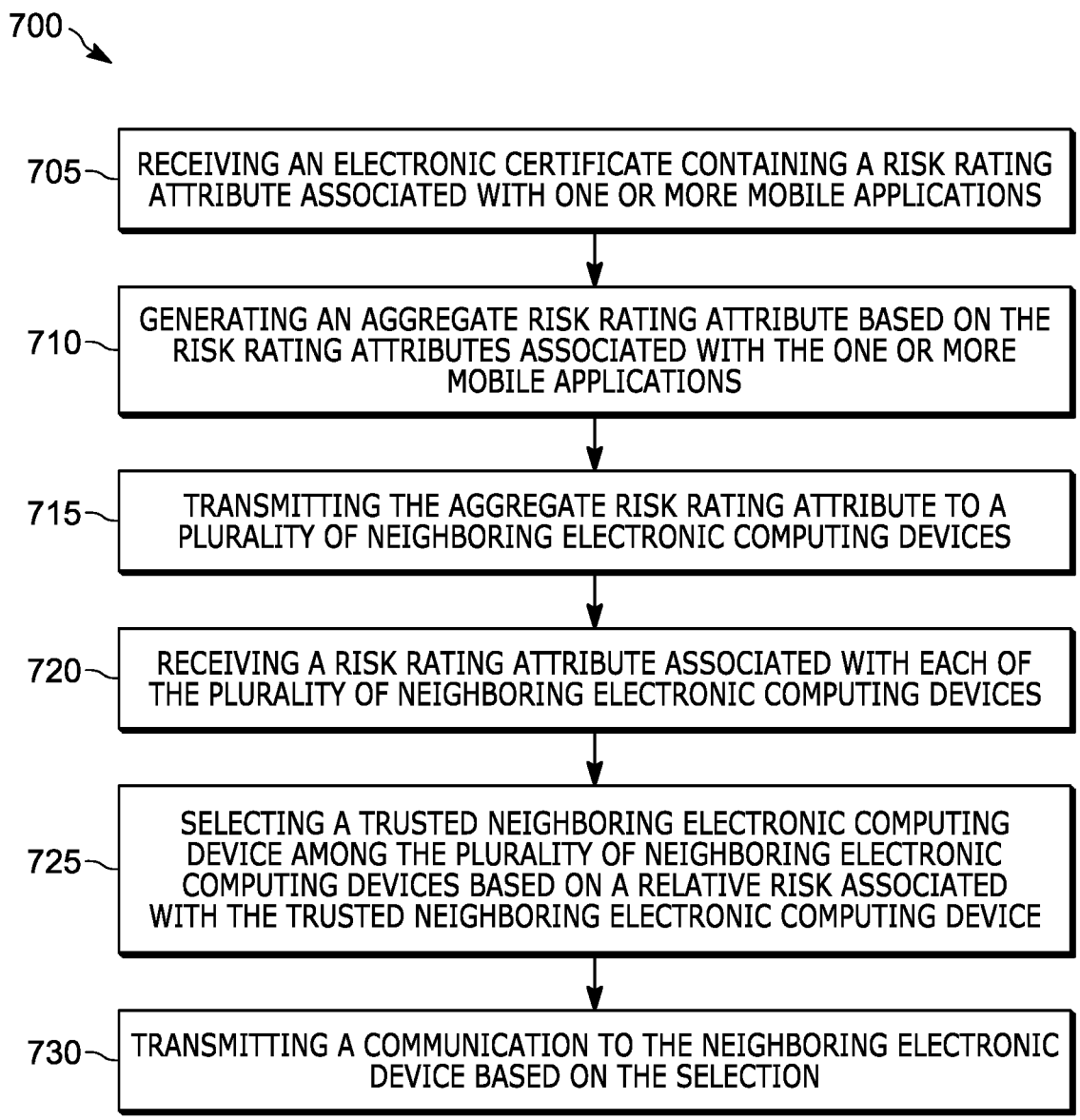
FIG. 7 illustrates a flow chart of a method of communicating in a vehicle-to-vehicle communication network in accordance with some embodiments.

FIG. 7 illustrates a flow chart of a method 700 of communicating in a vehicle-to-vehicle communication network in accordance with some embodiments. At block 705, the method 700 includes receiving an electronic certificate 330 containing a risk rating attribute 325 associated with a software application 310 (for example, a mobile application). For example, the electronic computing device 103 associated with the vehicle 102 receives the electronic certificate 330 from the certificate authority 120. For example, the electronic computing device 103 may receive user input at the user interface 250 requesting a new software application from the data server 140, which may include an application repository. A corresponding request for the electronic certificate 330 associated with the new software application may be provided by the electronic computing device 103 or the data server 140 to the certificate authority 120, which, in turn, provides the electronic certificate 330 to the vehicle 102. In some embodiments, the electronic certificate 330 includes one or more of the elements illustrated in FIG. 4, and the risk rating attribute 325 is assigned, by the certificate authority 120, to the software application based on a risk associated with the software application as described above with respect to FIG. 3.

The method 700 also includes generating an aggregate risk rating attribute based on the risk rating attributes associated with the one or more software applications (block 710). In some embodiments, generating the aggregate risk rating attribute based on the risk rating attribute includes determining an overall risk assessment representation for an electronic computing device. In some embodiments, the method 700 generates at least one of a minimum risk rating attribute 522, an average risk rating attribute 524, and a risk rating standard deviation 526 associated with the software applications installed in a vehicle. For example, the electronic computing device 103 associated with vehicle 102 is configured to generate the overall risk rating attribute 335 (for example, a mean) based on the risk rating of all the software applications associated with the electronic computing device 103. In some embodiments, the electronic computing device 103 is configured to access from the memory 230 the electronic certificate 330 for each software application on the electronic computing device 103 and retrieve the risk rating attribute 325 of each electronic certificate 330. The electronic computing device 103 then calculates an average of the retrieved risk rating attributes 325, and assigns the average as the aggregate risk rating attribute 335 of the vehicle 102.

In some embodiments, when the software application 310 is installed in the vehicle 102, an overall neighbor risk rating attribute 335 will be determined based on the relative risk associated with the software application 310 and any other software application already installed in vehicle 102. In some embodiments, the overall neighbor risk rating attribute is simply a value between "0" and "100". In one example, a "0" indicates that there is "0" percent risk of information being exposed if a request for information is made of vehicle 102, and a "100" indicates that there is a "100" percent risk of information exposure. In another example, the neighbor risk rating attribute is a relative score or grading on a scale (e.g., 0-10) rather than a percentage risk, with a "0" being at the low relative risk end of the scale and "10" being at the high relative risk end of the scale.

In some embodiments, a cost function is used to calculate the overall neighbor risk rating attribute. In one example, an average based on all the applications installed on the vehicle 102 (which includes adding the relative risk rating attribute from all the applications and dividing by the number of applications).

The method 700 further includes transmitting the overall risk rating attribute 335 to a plurality of neighboring electronic computing devices (block 715). For example, the electronic computing device 103 associated with vehicle 102 transmits an overall risk rating attribute (such as an aggregate or average risk rating attribute 606, shown in FIG. 6) to the electronic computing device 105 associated with vehicle 104. In some embodiments, transmitting the aggregate risk rating attribute to the plurality of neighboring electronic computing devices includes transmitting the aggregate risk rating attribute using a basic safety message beacon transmission between a first vehicle (for example, vehicle 102) and a second vehicle (for example, vehicle 104).

The method 700 also includes receiving a risk rating attribute associated with each of the plurality of neighboring electronic computing devices (block 720). For example, each of the electronic computing devices shown in FIG. 1 is configured to receive risk rating attributes from its neighbors. For example, the electronic computing device 103 within vehicle 102 is configured to receive risk rating attributes associated with its neighboring vehicles 104, 106, and 108 having electronic computing devices 105, 107, and 109, respectively.

The method 700 further includes selecting a trusted neighboring electronic computing device (for example, any one of 105, 107, and 109 that are neighbors to electronic computing device 103, as shown in FIG. 3) based on a relative risk associated with the trusted neighboring electronic computing device (block 725). In some embodiments, an electronic computing device accesses a table (similar to the neighbor table 600) listing the risk rating attributes associated with the neighboring electronic computing devices and based on the relative risk rating attribute associated with each neighbor selects a trusted neighboring electronic device having the least risk. In some embodiments, the electronic computing device may select more than one trusted neighboring electronic device. For example, the electronic computing device in a vehicle may compare the risk rating of each neighbor to a predefined risk rating (based on a risk tolerance level) and selects neighbor devices having risk rating that meets the predefined risk rating. In one embodiments, the risk tolerance level related to the vehicle to be chosen may be different for different types of data and different types of neighboring vehicles. In some embodiments, the method 700 includes storing and updating the plurality of risk rating attributes received from the plurality of neighboring electronic computing devices in the neighbor table 600.

The method 700 further includes transmitting a communication to the neighboring electronic device based on the selection (block 730). In some embodiments, when the trusted neighboring electronic communication device has been determined, a message is sent to the trusted neighboring electronic device to initiate the transfer of data back to the requesting electronic communication device. In some embodiments, the trusted neighboring electronic communication device is determined based on a comparison between the risk rating of the neighboring electronic communication device and a risk rating threshold associated with the electronic communication device in the vehicle seeking to download an application. In one example, if an application (that includes a vehicle owner's financial or privacy information) to be downloaded in an electronic communication device has a high risk rating then the only neighboring electronic communication devices having the desired high risk rating will be selected for communication in order to download the application.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a Read Only Memory (ROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device operating in a communication network, the electronic computing device comprising:
   a transceiver configured to communicate via the communication network; and
   an electronic processor coupled to the transceiver and configured to:
      receive, via the transceiver, an electronic certificate containing a risk rating attribute associated with one or more software applications;
      generate an aggregate risk rating attribute based on the risk rating attribute associated with the one or more software applications;
      transmit, via the transceiver, the aggregate risk rating attribute to a plurality of neighboring electronic computing devices;
      receive a risk rating attribute associated with each of the plurality of neighboring electronic computing devices;
      select a trusted neighboring electronic computing device among the plurality of neighboring electronic computing devices based on a relative risk associated with the trusted neighboring electronic computing device; and
      transmit a communication to the neighboring electronic computing device based on the selection.

2. The electronic computing device of claim 1, wherein the trusted neighboring electronic computing device is selected based on a comparison of the relative risk associated with the trusted neighboring electronic computing device with a risk tolerance level associated with the electronic computing device.

3. The electronic computing device of claim 1, wherein the aggregate risk rating attribute is associated with an overall risk assessment representation for the electronic computing device.

4. The electronic computing device of claim 1, wherein the electronic computing device is disposed within a vehicle associated with a vehicle-to-vehicle communication network.

5. The electronic computing device of claim 1, wherein the communication network is selected from the group consisting of a mesh network, a personal area network, a vehicle-to-vehicle communication network, and a local area network.

6. The electronic computing device of claim 1, wherein the electronic processor is configured to
   generate at least one selected from the group consisting of a minimum risk rating attribute, an average risk rating attribute, and a risk rating attribute standard deviation for a plurality of software applications installed in the electronic computing device.

7. The electronic computing device of claim 1, wherein the electronic processor receives the electronic certificate from a risk rating server.

8. The electronic computing device of claim 7, wherein the risk rating server is configured to
assign the risk rating attribute to the one or more software applications based on risk associated with the one or more software applications.

9. The electronic computing device of claim 1, wherein the transceiver is configured to transmit the aggregate risk rating attribute to the plurality of neighboring electronic computing devices via a beacon transmission.

10. The electronic computing device of claim 1, further comprising
a memory to store a table including a plurality of risk rating attributes received from the plurality of neighboring electronic computing devices.

11. The electronic computing device of claim 10, wherein the table includes at least one item selected from a group consisting of a neighbor node identifier, a minimum risk rating attribute, an average risk rating attribute, and a risk rating attribute standard deviation.

12. A method for communicating in a vehicle-to-vehicle communication network, the method comprising:
receiving an electronic certificate containing a risk rating attribute associated with one or more software applications;
generating an aggregate risk rating attribute based on the risk rating attribute associated with the one or more software applications;
transmitting, by an electronic processor via a transceiver, the aggregate risk rating attribute to a plurality of neighboring electronic computing devices;
receiving, by the electronic processor via the transceiver, a risk rating attribute associated with each of the plurality of neighboring electronic computing devices;
selecting, by the electronic processor, a trusted neighboring electronic computing device among the plurality of neighboring electronic computing devices based on a relative risk associated with the trusted neighboring electronic computing device; and
transmitting, by the electronic processor via the transceiver, a communication to the neighboring electronic computing device based on the selection.

13. The method of claim 12, wherein generating the aggregate risk rating attribute based on the risk rating attribute includes determining an overall risk assessment representation for an electronic computing device.

14. The method of claim 12, further comprising:
generating at least one selected from the group consisting of a minimum risk rating attribute, an average risk rating attribute, and a risk rating attribute standard deviation for a plurality of software applications installed in an electronic computing device.

15. The method of claim 12, further comprising:
receiving the electronic certificate from a risk rating server.

16. The method of claim 15, wherein receiving the electronic certificate includes
receiving the electronic certificate including at least one item selected from the group consisting of an application owner's name, an application owner's public key, an intermediate certificate authority name, an intermediate certificate authority signature, and a relative risk rating attribute.

17. The method of claim 12, further comprising:
assigning the risk rating attribute to a software application based on a risk associated with the software application.

18. The method of claim 12, wherein transmitting the aggregate risk rating attribute to the plurality of neighboring electronic computing devices includes
transmitting the aggregate risk rating attribute using a basic safety message beacon transmission between a first vehicle and a second vehicle.

19. The method of claim 12, further comprising:
storing and updating a plurality of risk rating attributes received from the plurality of neighboring electronic computing devices in a table.

20. The method of claim 19, wherein storing the plurality of risk rating attributes in the table comprises
storing in the table at least one item selected from the group consisting of a neighbor node identifier, a minimum risk rating attribute, an average risk rating attribute, and a risk rating attribute standard deviation.

* * * * *